United States Patent [19]

Enei et al.

[11] 3,922,193

[45] Nov. 25, 1975

[54] METHOD OF PRODUCING GUANOSINE-5'-MONOPHOSPHATE

[75] Inventors: Hitoshi Enei, Zushi; Hiroshi Matsui, Yokohama; Yoshio Hirose, Fujisawa, all of Japan

[73] Assignee: Ajinomoto Co., Inc., Tokyo, Japan

[22] Filed: Oct. 7, 1974

[21] Appl. No.: 512,466

[30] Foreign Application Priority Data
Oct. 12, 1973  Japan.............................. 48-114486

[52] U.S. Cl................................................ 195/28 N
[51] Int. Cl.².......................................... C12D 13/06
[58] Field of Search................................... 195/28 N

[56] References Cited
UNITED STATES PATENTS

| | | | |
|---|---|---|---|
| 3,586,604 | 6/1971 | Yamanoi et al. | 195/28 N |
| 3,620,921 | 11/1971 | Abe et al. | 195/28 N |

*Primary Examiner*—Alvin E. Tanenholtz
*Attorney, Agent, or Firm*—Hans Berman; Kurt Kelman

[57] ABSTRACT

Inosine and hypoxanthine are converted in the presence of phosphate ions to 5'-guanylic acid in good yield in culture media of an artificially induced mutant of Corynebacterium sp. ATCC 21251 which lacks guanosine-5'-monophosphate reductase.

4 Claims, No Drawings

METHOD OF PRODUCING GUANOSINE-5'-MONOPHOSPHATE

This invention relates to the production of guanosine-5'-monophosphate, and particularly to a method of converting inosine or hypoxanthine to guanosine-5'-monophosphate by means of a microorganism.

It has been disclosed in U.S. Pat. No. 3,586,604 that Corynebacterium sp. AJ 1562 (FERM-P 47 or ATCC 21251) converts guanosine in its culture medium to 5'-guanylic acid (guanosine-5'-monophosphate) when the culture medium for the microorganism contains phosphate ions. The guanylic acid is a known seasoning agent.

It has now been found that a mutant of the known Corynebacterium strain which requires hypoxanthine for its growth and which is defective in guanosine-5'-monophosphate reductase can produce 5'-guanylic acid from hypoxanthine or inosine and phosphate ions in an otherwise conventional culture medium, and that the yield of 5'-guanylic acid can be very high.

The best 5'-guanylic acid producers among the artificially induced mutants of Corynebacterium sp. AJ 1562 are resistant to 8-azaguanine, and the highest yields have been obtained from the strain AJ 3616 (FERM-P 2312) which has been deposited with the Fermentation Research Institute, Agency of Industrial Science and Technology, at Inage, Chiba-shi, Japan, and is available from the Institute under the accession number indicated above.

The mutant was obtained from the parent strain by exposing a culture of the latter to a 250 $\gamma$ml solution of N-methyl-N'-nitro-N-nitrosoguanidine at 30°C for 30 minutes, and by isolating hypoxanthine-requiring mutants from the exposed parent strain by the replication method. The guanidine-5'-monophosphate reducatase deficient mutants are isolated from others according to their inability of converting guanosine-5'-monophosphate to the corresponding inosinic acid.

Culture media in which inosine and hypoxanthine are converted to guanylic acid by a microorganism of the invention contain the usual assimilable sources of carbon and nitrogen, together with inorganic ions and minor organic nutrients necessary for the growth of the microorganism in addition to the inosine or hypoxanthine, phosphate ions, and such specific nutrient which the microorganism may require in addition to the starting material to be converted if the latter is not, or does not, contain the necessary hypoxanthine.

The hypoxanthine or inosine may be added to the culture medium entirely at the start of cultivation, or gradually during cultivation. This starting material may be in the form of crude crystals, in the form of a pure aqueous solution, or as an ingredient of a fermentation broth in which it was produced by another microorganism.

The phosphate ions may be supplied to the culture medium as phosphoric acid or as a water-soluble phosphate whose cationic moiety is non-toxic to the microorganism. The water-soluble mono-, di-, and triphosphates of potassium, sodium, ammonium, and magnesium are typical sources of phosphate ions for the purpose of this invention. The phosphate ion concentration should be between 0.5 and 2.5 g/dl for highest yields.

Suitable carbon sources include glucose, fructose, mannose, sucrose, starch hydrolyzate, molasses, acetic acid, ethanol, fatty acids, glycerol, and gluconic acid. Ammonium salts, nitrates, ammonia, and urea are typical nitrogen sources. The necessary inorganic ions may include potassium, magnesium, iron, manganese, and sulfate. Vitamines, amino acids, and the ingredients of complex mixtures, such as yeast extract, bouillon, corn steep liquor, peptone, soyprotein hydrolyzate, casein hydrolyzate, or malt extract may furnish minor organic nturients.

The cultivation is preferably carried out aerobically at pH 5–8, and at 25°–40°C. The maximum concentration of 5'-guanylic acid in the broth is reached after 2 to 5 days, depending on specific culturing conditions.

The 5'-guanylic acid accumulated in the cultrue medium is recovered by any one of the known methods, as by extraction or the use of ion exchange resins.

The following Examples are further illustrative of this invention.

EXAMPLE 1

Corynebacterium sp. AJ 3616 was cultured 24 hours at 30°C on an aqueous seed culture medium containing, per deciliter, 2 g glucose, 1 g yeast extract, 0.5 g peptone, 0.5 g NaCl, and 5 mg hypoxanthine. 2 Ml inocula of the seed culture broth were transferred to 20 ml batches of an aqueous fermentation medium containing, per deciliter, 10 g glucose, 3 g $KH_2PO_4$, 2 g $MgSO_4 \cdot 7H_2O$, 0.5 g $(NH_4)_2HPO_4$, 1.0 g yeast extract, 3 ml soyprotein hydrolyzate, 0.5 g glutamine, 20 $\gamma$ biotin, 1 mg $FeSO_4 \cdot 7H_2O$, 0.5 g inosine, and 5 g $CaCO_3$, and adjusted to pH 6.5 with KOH. The 500 ml flasks respectively containing the inoculated media were shaken at 34°C for 72 hours, when they were found to contain 0.25 g/dl guanosine-5'-monophosphate.

The several broths were filtered, one liter of the combined filtrates was adjusted to pH 1.5 with HCl, and passed over a column of an ion exchange resin ("Diaion"SK No. 1, in the $H^+$ form). When the eluate was adjusted to pH 7.2 with sodium hydroxide solution, partly evaporated, and cooled, 0.85 g guanosine-5'-monophosphate was precipitated and recovered.

When the parent strain Corynebacterium sp. AJ 1562 was cultured in the same manner, no guanosine-5'-monophosphate was found in the culture broth.

EXAMPLE 2

The procedure of Example 1 was repeated except for replacement of inosine in the fermentation broth by 0.25 g/dl hypoxanthine. At the end of the culturing period, the medium was found to contain 0.22 g/dl guanosine-5'-monophosphate. Again, the parent strain Corynebacterium sp. AJ 1562 was found incapable of producing any guanosine-5'-monophosphate from hypoxanthine.

What is claimed is:

1. A method of producing guanosine-5'-monophosphate which comprises culturing the strain Corynebacterium sp. FERM-P 2312 in an aqueous culture medium containing assimilable sources of carbon and nitrogen, inorganic ions and minor organic nutrients necessary for the growth of said strain, a starting material selected from the group consisting of inosine and hypoxanthine, and phosphate ions until said starting material is converted to quanosine-5'-monophosphate, and said guanosine-5'-monophosphate accumulates in said medium, and recovering the accumulated guanosine-5'-monophosphate from said medium.

2. A method as set forth in claim 1, wherein said medium contains at least 5 mg/dl of said starting material.

3. A method as set forth in claim 1, wherein said medium contains 0.5 g/dl inosine.

4. A method as set forth in claim 1, wherein said medium contains 0.25 g/dl hypoxanthine.

* * * * *